United States Patent
Merry

(10) Patent No.: US 10,504,377 B2
(45) Date of Patent: Dec. 10, 2019

(54) TEST SCANNING AND EVALUATION SYSTEM

(71) Applicant: Mark S. Merry, Holly Springs, NC (US)

(72) Inventor: Mark S. Merry, Holly Springs, NC (US)

( * ) Notice: Subject to any disclaimer, the term of this patent is extended or adjusted under 35 U.S.C. 154(b) by 367 days.

(21) Appl. No.: 15/281,759

(22) Filed: Sep. 30, 2016

(65) Prior Publication Data

US 2018/0096620 A1    Apr. 5, 2018

(51) Int. Cl.
  *G09B 7/06* (2006.01)
(52) U.S. Cl.
  CPC ...................... *G09B 7/06* (2013.01)
(58) Field of Classification Search
  CPC . G09B 7/06; G09B 7/02; G09B 7/066; G09B 7/00; G06K 9/00; G06K 1/00; G06K 5/00
  USPC .......................................... 434/322
  See application file for complete search history.

(56) References Cited

U.S. PATENT DOCUMENTS

| | | | | |
|---|---|---|---|---|
| 3,763,576 A | * | 10/1973 | Sulkin | G09B 3/06 434/322 |
| 3,970,312 A | * | 7/1976 | Senn | A63F 9/18 273/282.1 |
| 7,306,148 B1 | * | 12/2007 | Morganstein | G07C 13/00 235/386 |
| 2015/0187219 A1 | * | 7/2015 | Sheppard | G06T 3/00 434/354 |

OTHER PUBLICATIONS

Benchoff, Brian. "Reading Punch Cards With an Arduino and Digital Camera". Published by hackaday.com on Jul. 30, 2012. Accessed Jan. 7, 2019 from <https://hackaday.com/2012/07/30/reading-punch-cards-with-an-arduino-and-digital-camera/>.*

* cited by examiner

*Primary Examiner* — Jerry-Daryl Fletcher
(74) *Attorney, Agent, or Firm* — Mu P.C.

(57) ABSTRACT

An answer evaluation system has an answer tablet, having a plurality of perforations forming a grid, wherein a peg is insertable into any perforation. In an embodiment the answer table and pegs are opaque, while perforations allow light to flow through. Further, the answer tablet may be positioned upon an enclosure designed to receive the answer tablet. The enclosure is adapted to direct light through a translucent cover positioned over an aperture of the enclosure. The enclosure houses a light source in communication with a power source. Further, a test evaluation system has a camera for receiving an image and an evaluation system for evaluating the image from the camera. A method of scoring includes a test-taker placing an answer peg into the perforations of the answer tablet, and a system evaluating and matching answers from a test taker to an answer key.

1 Claim, 4 Drawing Sheets

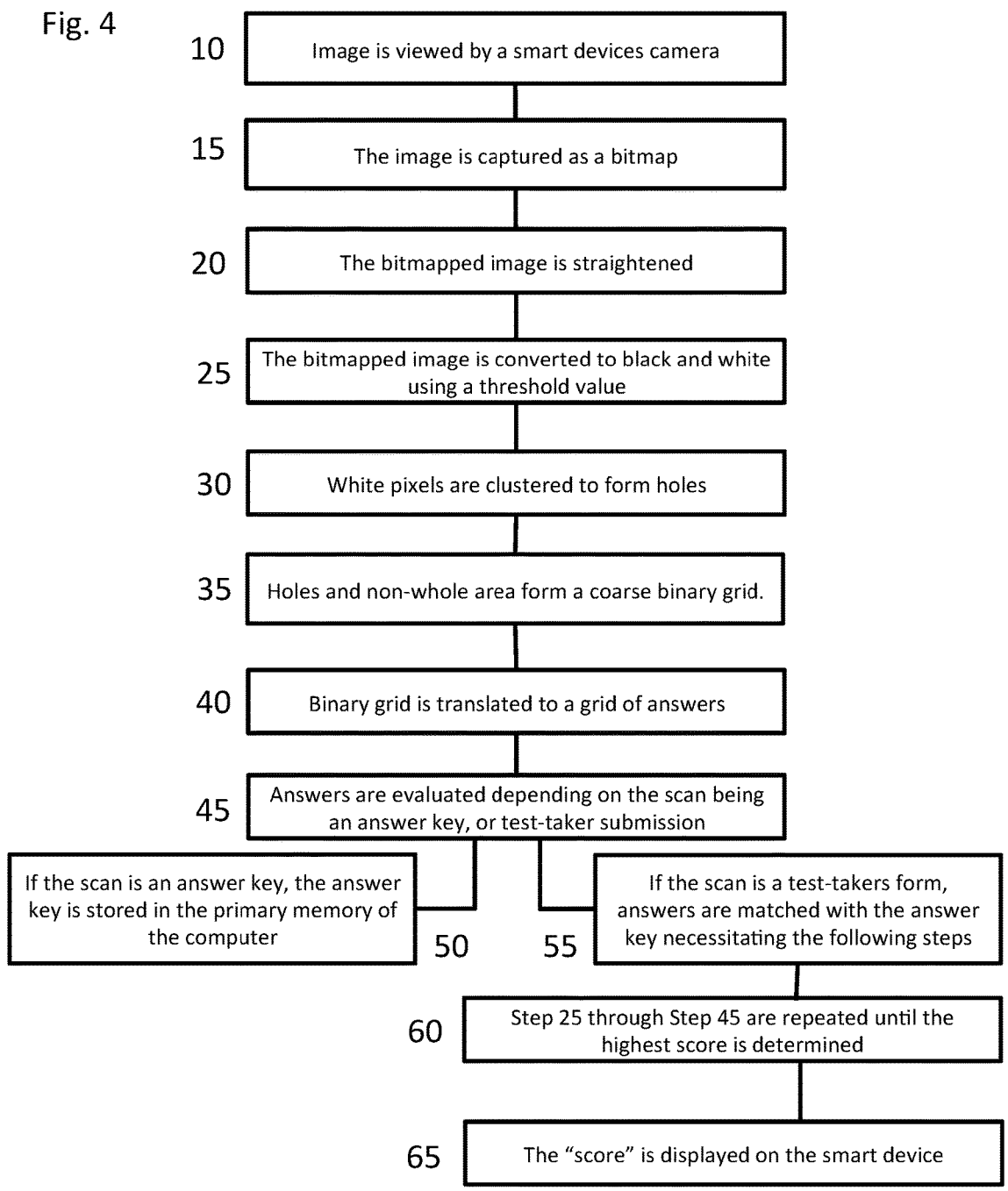

TEST SCANNING AND EVALUATION SYSTEM

BACKGROUND OF THE INVENTION

1. Field of Invention

The present invention relates to the field of test answer forms and more specifically to the field of an answer form scanning system and software therein.

2. Description of Related Art

Testing is a ubiquitous part of modern society. The technology has changed drastically in recent years. Long gone are the days of writing test answers in writing with a pen or pencil. The technology requires far too much paper, writing utensil, and employee resources to be favorable.

Tests requiring longhand writing typically require many pieces of paper. As is known, the paper must come from somewhere, and in many cases its production requires huge amounts of natural resources and deforestation. On top of this, transportation of the heavy material is an environmental pollutant, forming a two-fold hit on the environment.

To combat this problem, machine-readable test documents were developed and utilized when a multiple-choice format for the test was used. These documents are placed through an imaging scanner in order to analyze which answers are selected. With this technology, a specific pencil is required to fill in boxes that coordinate with both test questions and answer options of those questions. If they testing center does not provide the correct pencil, the tester may be forced to miss the test. Furthermore, if the tester misplaces pencil lead in answer boxes in which the lead does not belong, the image scanner may record an unintended answer.

The correct pencil was needed in the past as the image scanner created a binary image. This method produced problems and more sophisticated image scanners took their place.

While the time saved makes the device convenient for the proctor, these systems can be expensive, pricing-out some markets. Image scanners used by popular system view the answer form in a similar fashion as the human eye. The technology is the main money generator for companies producing the prior art. This business model is expensive and environmentally unfriendly as each testing center or classroom must have its own image scanner.

Recent advancements in technology have lead many test proctors to switch to a computer format. While this satisfies environmental concerns, relying solely on software to issue, score, and relay results of a test can have its own inherent problems. Many of these pertain to the testing system not responding properly and the test-taker missing the time frame given for the test. Furthermore, if the test is to be taken in one sitting and the system crashes, the test-taker may be given an automatic no-pass. At this time, biometric identification of the test-taker is not practical.

Further, test-evaluating systems have been developed which utilize existing nonspecific hardware in order to evaluate answers. Current technology ranges from utilizing a standard document scanner, such as those connected to a personal computer, to scan a paper test form. Some systems allow the user to create their own test form, however, these application demand single use paper. It is a goal of the invention herein to reduce the environmental impact of exams. Embodiments are available that either use the internet to evaluate, store, and analyze information, as well as embodiments which require their own software application.

Some more recent inventions also rely on a smart device camera to scan an image of the tests, followed by utilizing evaluation software to analyze an answer form. There are multiple pitfalls with these platforms. First, scanning an answer form relies on the accuracy of a smart phone camera, the camera analyzes light and dark pixels on the answer form and guesses as to which bubbles are filled in. Results may be skewed by ambient lighting in the room, leaving increasing margins of error in the results. Further, these embodiments still rely on single-use paper products to be used as the answer form.

Based on the foregoing, there is a need in the art for an environmentally friendly, cost efficient, mobile enabled, and discrete grading system that provides a fast and accurate method of grading while retaining ease of use. Furthermore, improvements are needed to use pre-existing technology, such as a smart device, in order to reduce manufacturing and environmental impacts.

SUMMARY OF THE INVENTION

In an embodiment, an answer evaluation system has an enclosure with a hollow interior defined by one or more sides, an open top, and a bottom. A light source is positioned within the interior, and an answer tablet having a plurality of perforations oriented to form a grid is in communication with the top of the enclosure. Pegs engage with the perforations in the answer tablet.

In an embodiment, the answer tablet is made of an opaque material. The answer tablet is adapted to receive a plurality of answers pegs, of which are opaque and insertable into the perforations of the answer tablet. In a specific embodiment, each peg is frustoconical, facilitating insertion into the answer tablet and sourced from the perforations of the answer tablet.

In an embodiment, one or more sides of the enclosure are opaque, such that when a translucent or transparent cover engages with the top of the enclosure, light passes through the cover. When the answer tablet is positioned on a top surface of the cover, light passing through the cover is directed through the perforations.

In an embodiment, the light source is in communication with a power source.

In an embodiment, a test evaluating system comprises a camera that receives an image. Further, the test evaluating system comprises an evaluation system that evaluates the image received from the camera.

In an embodiment, a method of evaluating a test comprises, first, a test-taker placing the pegs into perforations of the answer tablet. Next, an image is viewed of the answer tablet using the camera. Answers are evaluated by first, determining if the answer tablet is an answer key or test-taker submission.

In an embodiment, the answer key is stored in a server.

In an embodiment, answers are matched from the test-taker with the answers of the answer key.

In an embodiment, a score is displayed based on the analysis of the test-taker answer tablet with that of the answer key.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

FIG. 4 is a flowchart regarding a method of use, according to an embodiment of the present invention.

DETAILED DESCRIPTION OF PREFERRED EMBODIMENTS

Figure 1:
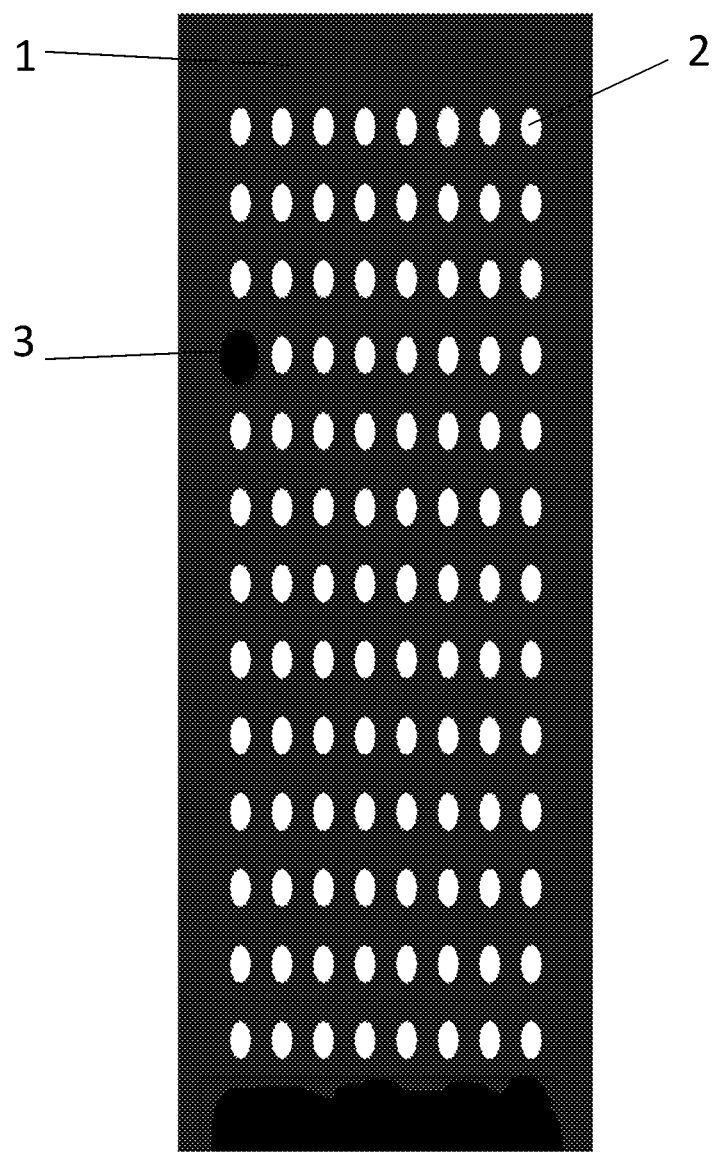
FIG. 1 is a plan view of the answer tablet, according to an embodiment of the present invention.

Preferred embodiments of the present invention and their advantages may be understood by referring to FIGS. 1-4, wherein like reference numerals refer to like elements.

In reference to FIG. 1, an answer tablet 1 is shown in an embodiment of the present invention. In a preferred embodiment, the answer tablet is manufactured with an opaque material as to prohibit light from passing through. A plurality of perforations 2 will be made through the material and arranged in a grid. Each perforation 2 will correspond to a question, and furthermore an answer of that question, on a test given to the test taker. Each perforation will have a corresponding peg that can be input by the user. The pegs will be manufactured to completely fill the perforation 2 in the answer tablet 1, in order to prevent light from flowing through in the specific area of the peg.

In a preferred embodiment, the answer tablet is a cuboid, giving a three-dimensional shape allowing for the answer pegs 3 to be sourced from the perforations of the answer tablet 1.

In an embodiment, pegs are produced as a by-product of the manufacturing process. As the answer tablet is sent to a press where perforations are punched. The perforations created, and matter of the answer tablet, which created the perforations are used as a peg or answer input.

In a preferred embodiment, the answer tablet 1 and pegs are reusable as many times as the strength of the material permits. The answer tablet will be constructed from EVA foam, however any material known in the art will suffice. A requirement of the tablet and pegs is the creation of a light differential between the tablet including pegs input to the answer tablet 1, and perforations 2.

In a preferred embodiment, perforations 2 are made through the answer tablet 1 such that a 13-row by 8-column grid is formed. Two perforations 2 will correspond to each question, allowing for four possible answers to be transmitted onto the answer tablet 1. For example, four combinations may be shown with + representing a peg and thus no light traveling through the perforation 2, and − representing no peg, giving combinations: [(++), (+−), (−+), and (−−)].

In another embodiment, additional rows and columns are present in accordance with a test that has more questions, or more potential answers to a given question. For example, a test with eight potential answers for each question would require an answer tablet designed with three perforations for each question.

In an embodiment, the pegs are placed into the answer tablet 1 forming a complete light barrier. The fit between the peg and answer tablet 1 is crucial to the operation of the design and especially crucial to the accuracy of the scoring feature. A complete blockage of light passing through the perforation aid in the accurate creation of a binary image by a scoring application, subsequently introduce in the application. Prior art utilizes an image scanner which views prior art scoring forms much like the human eye. These systems are expensive and still submit errors. A binary system is far less expensive and is able to utilize smart device technology, rather than its own discreet system.

In a preferred embodiment, perforations 2 in the answer tablet 1, may be molded in a frustoconical shape matching a frustoconical shape of the pegs. The frustoconical shape allows for the engagement of the peg and answer tablet to prohibit light from passing through.

Figure 2:
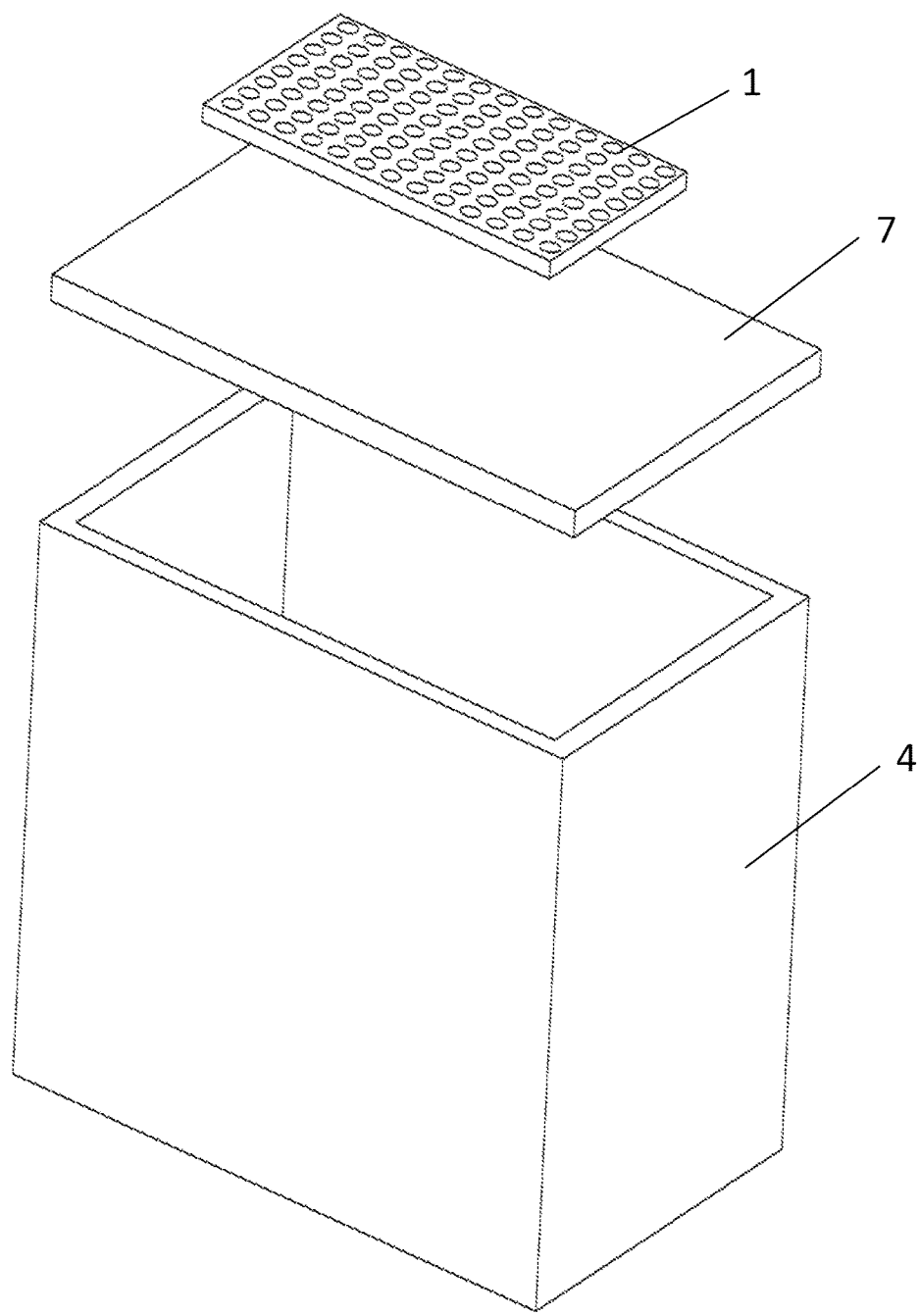
FIG. 2 is an exploded perspective view of the light enclosure, according to an embodiment of the present invention.

In reference to FIG. 2, a light enclosure is described in an embodiment of the present invention. The light enclosure comprises an enclosure 4, light source 8, and translucent or semi-translucent cover 7. An enclosure 4 is constructed with one open side in order to allow light emitted from a light bulb to pass through.

In a preferred embodiment of the design, the enclosure 4 is a box having five sides defining an open face cube or rectangle. It is preferred that the enclosure be made of an opaque material in order to reflect and direct light through the semi-translucent cover 7. A light source 8 within requires the enclosure to be high enough to enclose the light. The sixth side will be constructed from a translucent or semi-translucent material 7, such as foam, evenly distributing light emitted from the light source 8. The dimensions of the semi-translucent material 7 will be such that it either fits into or can lie on top of the enclosure 4.

In an additional embodiment, the enclosure may be constructed from a variety of materials known in the art. Materials may be opaque or translucent. A translucent enclosure may be beneficial to allow numerous answer tablets to be analyzed simultaneously.

In an embodiment, the shape of the enclosure may be modified to any shape known in the art. A plurality of enclosure shapes and constructions may be useful in the scoring accuracy of the system as well as aesthetic appeal of the device.

In an additional embodiment, the opaque and translucent characteristics of the answer tablet and pegs may be reversed. For example, the answer tablet may be manufactured from a translucent or semi-translucent material necessitating that the pegs remain opaque. Any combination of opaque and translucent material may be used, with the requirement remaining that an answer submitted by the test-taker must be readable by a binary image scanning system such as the smart device software described herein.

Figure 3:
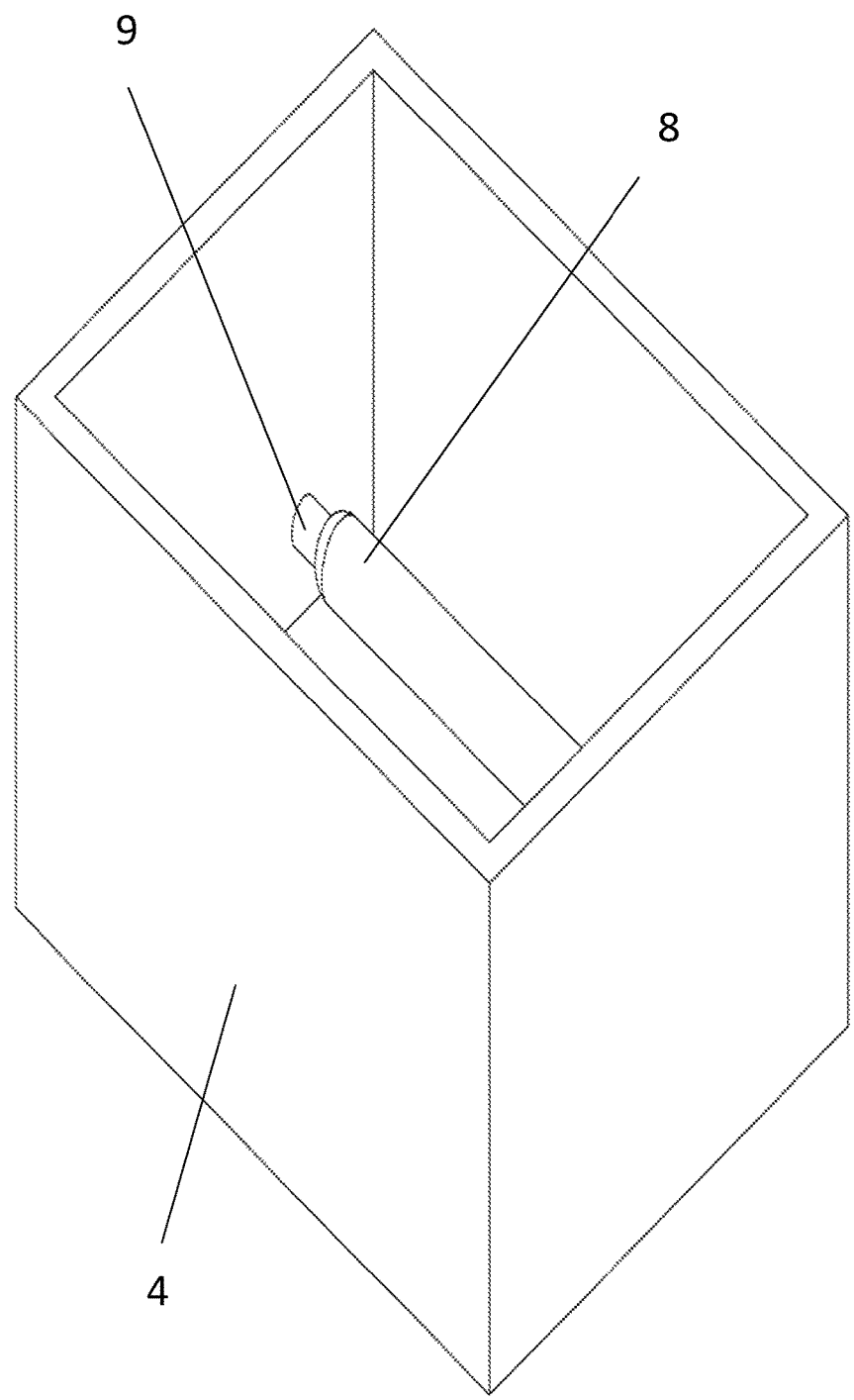
FIG. 3 is a perspective view of the enclosure including a light source, according to an embodiment of the present invention.

In reference to FIG. 3, the enclosure 4 with a light source 8 is shown in an embodiment of the design. The light source 8 and electrical wiring components required may be integrated into the enclosure 4, adding to ease of use of the device.

In a preferred embodiment, the light source 8 will be a pair of light bulbs. It is beneficial to select a light source that will not heat excessively if used for extended periods to avoid a potential fire. The light source 8 will emit a white light in order to create the highest possible contrast between the answer tablet 1 and perforations 2 in which the light will shine through. The light source will be strategically positioned to disperse light evenly from the semi-translucent material 7.

In an embodiment, the light source will be fixed to the enclosure with a lamp-holding adapter 9 in order to transmit power to the light source, and hold the light source in a fixed position.

In a preferred embodiment, the light enclosure will be constructed from inexpensive materials, having a price point much lower than other analytical methods known in the art. Inexpensive materials such as cardboard for the enclosure, EVA foam for the answer tablet, and LED for the light source.

In an embodiment, the light enclosure 4 and light source 8 are integrated into a mobile application. The mobile application has the ability to turn the device to an ON function. The application may have the ability to modulate light intensity to a plurality of light and dim settings.

In reference to FIG. 4, a method used by the software to evaluate answers is described in an embodiment of the present invention. Upon completion of the test and the desired answers input onto the tablet by the test-taker, the answer tablet is placed on the semi-translucent side of the light enclosure. The light source is turned to an ON function to emit light through the semi-translucent side of the enclosure and continues through the perforations on the answer tablet that are not plugged with a peg.

In step 5, the algorithm used by the software, which has been previously downloaded to a user's phone, will view an image of the answer tablet through the lens of a corresponding smart device camera. In step 10, the image is captured as a bitmap. In step 15, the bitmapped image is straightened. In step 20, the bitmapped image is converted to black and white using a threshold value. Pixels whose luminance exceeds a pre-determined value will be considered white, while the pixels not meeting the threshold value will be considered black. In step 25, white pixels are clustered to form perforations, in correspondence with those submitted on the answer tablet. In step 30, perforations and non-perforation areas form a binary grid. White perforations in the grid correlate to a binary one, non-perforations correlate to a binary zero. This binary grid forms a condensed bitmap that translates to a grid of answers.

In step 35, the answers are evaluated. In the event the scanned image is the answer key, the key is stored in the primary memory of the computer, comprising optional step 40.

In step 45, the test-takers form is matched with the answer key, requiring steps 20 through 35. Step 20 uses a threshold value to determine which pixels are black or white. The threshold values are then adjusted—increased or decreased—during each iteration of the loop. In step 50, the test "score" is displayed on the screen of the smart device.

In an embodiment, the number of light pixels required to form a perforation may be increased or decreased depending on the design of the test answer tablet. Increasing or decreasing this threshold allows for an optimal score to be achieved in response to a more accurate scan occurring.

In an embodiment, the software application is integrated to a grade reporting platform, in which the administrator of the exam is able to record and submit grades to test-takers. Furthermore, the software application will have the ability to control the light source and light enclosure, switching the system to an ON function. As mentioned, it may be useful to modulate the light intensity emitted by the light source.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A
method of evaluating an answer tablet comprising the steps of:
    placing answer pegs into perforations of the answer tablet;
    viewing an image of the answer tablet using a camera; and
    evaluating a grid of answers comprising the steps of:
        determining if the answer tablet is an answer key or a test-taker submission;
        storing the answer key in a server;
        matching answers from the test-taker submission with answers from the answer key; and
        displaying a score.

\* \* \* \* \*